(12) United States Patent
Post

(10) Patent No.: US 6,191,515 B1
(45) Date of Patent: Feb. 20, 2001

(54) COMBINED PASSIVE MAGNETIC BEARING ELEMENT AND VIBRATION DAMPER

(75) Inventor: Richard F. Post, Walnut Creek, CA (US)

(73) Assignee: The Regents of the University of California, Oakland, CA (US)

( * ) Notice: Under 35 U.S.C. 154(b), the term of this patent shall be extended for 0 days.

(21) Appl. No.: 09/389,913

(22) Filed: Sep. 3, 1999

(51) Int. Cl.[7] .............................. H02K 7/09; F16C 32/04
(52) U.S. Cl. .................................................. 310/90.5
(58) Field of Search ............................................. 310/90.5

(56) References Cited

U.S. PATENT DOCUMENTS

| | | | | |
|---|---|---|---|---|
| 5,319,275 | * | 6/1994 | Tozoni | 310/90.5 |
| 5,495,221 | | 2/1996 | Post | 335/299 |
| 5,825,105 | * | 10/1998 | Barber et al. | 310/12 |
| 5,847,480 | | 12/1998 | Post | 310/90 |

FOREIGN PATENT DOCUMENTS

| | | | | |
|---|---|---|---|---|
| 60-125414 | * | 7/1985 | (JP) | 310/90.5 |
| 8-023689 | * | 1/1996 | (JP) | 310/90.5 |

* cited by examiner

*Primary Examiner*—Karl Tamai
(74) *Attorney, Agent, or Firm*—Alan H. Thompson

(57) ABSTRACT

A magnetic bearing system contains magnetic subsystems which act together to support a rotating element in a state of dynamic equilibrium and dampen transversely directed vibrations. Mechanical stabilizers are provided to hold the suspended system in equilibrium until its speed has exceeded a low critical speed where dynamic effects take over, permitting the achievement of a stable equilibrium for the rotating object. A state of stable equilibrium is achieved above a critical speed by use of a collection of passive elements using permanent magnets to provide their magnetomotive excitation. In a improvement over U.S. Pat. No. 5,495,221, a magnetic bearing element is combined with a vibration damping element to provide a single upper stationary dual-function element. The magnetic forces exerted by such an element, enhances levitation of the rotating object in equilibrium against external forces, such as the force of gravity or forces arising from accelerations, and suppresses the effects of unbalance or inhibits the onset of whirl-type rotor-dynamic instabilities. Concurrently, this equilibrium is made stable against displacement-dependent drag forces of the rotating object from its equilibrium position.

15 Claims, 5 Drawing Sheets

COMBINED PASSIVE MAGNETIC BEARING ELEMENT AND VIBRATION DAMPER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to an improvement in magnetic bearing/suspension systems for the near-frictionless support of rotating elements, such as flywheels, electric motors and generators and the like. More specifically, the invention is directed to a special passive bearing element employed in a dynamically stable, passive, totally magnetically energized bearing/suspension system that does not require electrically activated servo controlled systems to attain a stable equilibrium at operating speed.

2. Description of Related Art

Motor and generator armatures, flywheel rotors, and other rotatable components have conventionally been supported and constrained against radially and axially directed forces by mechanical bearings, such as journal bearings, ball bearings, and roller bearings. Such bearings necessarily involve mechanical contact between the rotating element and the bearing components, leading to problems of friction and wear that are well known. Even non-contacting bearings, such as air bearings, involve frictional losses that can be appreciable, and are sensitive to the presence of dust particles. In addition, mechanical bearings, and especially air bearings, are poorly adapted for use in a vacuum environment.

The use of magnetic forces to provide a non-contacting, low friction equivalent of the mechanical bearing is a concept that provides an attractive alternative, one which is now being exploited commercially for a variety of applications. All presently available commercial magnetic bearing/suspension elements are subject to limitations, arising from a fundamental physics issue, that increase their cost and complexity. These limitations make the conventional magnetic bearing elements unsuitable for a wide variety of uses where complexity-related issues, the issue of power requirements, and the requirement for high reliability are paramount.

The physics issue referred to is known by the name of Earnshaw's Theorem. According to Earnshaw's Theorem (when it is applied to magnetic systems), any magnetic suspension element, such as a magnetic bearing that utilizes static magnetic forces between a stationary and a rotating component, cannot exist stably in a state of equilibrium against external forces, e.g. gravity. In other words if such a bearing element is designed to be stable against radially directed displacements, it will be unstable against axially directed displacements, and vice versa. The assumptions implicit in the derivation of Earnshaw's Theorem are that the magnetic fields are static in nature (i. e. that they arise from either fixed currents or objects of fixed magnetization) and that diamagnetic bodies are excluded.

The almost universal response to the restriction imposed by Earnshaw's Theorem has been the following: Magnetic bearing elements are designed to be stable along at least one axis, for example, their axis of symmetry, and then external stabilizing means are used to insure stability along the remaining axes. The "means" referred to could either be mechanical, i. e. ball bearings or the like, or, more commonly, electromagnetic. In the latter approach magnet coils are employed to provide stabilizing forces through electronic servo amplifiers and position sensors that detect the incipiently unstable motion of the rotating element and restore it to its (otherwise unstable) position of force equilibrium.

Less common than the servo-controlled magnetic bearings just described are magnetic bearings that use superconductors to provide a repelling force acting against a permanent magnet element in such a way as to stably levitate that magnet. These bearing types utilize the flux-excluding property of superconductors to attain a stable state, achieved by properly shaping the superconductor and the magnet so as to provide restoring forces for displacements in any direction from the position of force equilibrium. Needless to say, magnetic bearings that employ superconductors are subject to the limitations imposed by the need to maintain the superconductor at cryogenic temperatures, as well as limitations on the magnitude of the forces that they can exert, as determined by the characteristics of the superconductor employed to provide that force.

The magnetic bearing approaches that have been described represent the presently utilized means for creating a stable situation in the face of the limitations imposed by Earnshaw's Theorem. The approach followed by the first one of these (i.e., the one not using superconducting materials) is to overcome these limitations by introducing other force-producing elements, either mechanical, or electromagnetic in nature, that restore equilibrium. The latter, the servo-controlled magnetic bearing, is usually designated as an "active" magnetic bearing, referring to the active involvement of electronic feedback circuitry in maintaining stability.

Recently, U.S. Pat. No. 5,495,221, issued to Post (herein referred to as "Post '221", has described what can be called a "passive" magnetic bearing system. That is, a combination of stationary and rotating elements that together achieve a stable state against perturbing forces without the need for either mechanical, diamagnetic, or electronically controlled servo systems.

Such a system differs fundamentally from previous prior art in that it provides a magnetic bearing system (as opposed to a magnetic bearing element) that can support a rotating object, and that achieves a dynamically stable state, even though any one of its elements, taken alone, would be incapable of stable static levitation. The system described in Post '221 results in reduction in complexity, together with concomitant increases in reliability, reductions in cost, and virtual elimination of power losses that it permits, relative to systems using servo-controlled magnetic bearings.

However, a need still exists to improve such a system. The Post '221 system employs axially symmetric passive levitating elements energized by permanent magnets, and further employs special stabilizer elements to overcome the limitations of Earnshaw's theorem. Nevertheless, suppression of the effects of unbalance or inhibition of the onset of whirl-type rotor-dynamic instabilities driven by displacement-dependent drag forces are achieved in the Post '221 system, if at all, by using vibration dampers that are independently located and separate components from the levitating and/or stabilizer elements.

SUMMARY OF THE INVENTION

The present invention provides a system that satisfies the conditions required for a rotating body to be stably supported by a magnetic bearing system as well as novel forms and combinations of the elements of such a system that satisfy these conditions under dynamic conditions, i.e., when the rotation speed exceeds a lower critical value. The invention achieves a state of stable equilibrium above a critical speed by use of a collection of passive elements using permanent magnets to provide their magnetomotive excitation.

The present invention is an improvement of the passive magnetic bearing element described in the above-mentioned Post '221 patent and incorporates a vibration damper within the passive magnetic bearing element of the magnetic bearing system. The passive magnetic bearing element includes (1) a novel upper stationary element containing a disc-shaped soft iron plate laminated on its lower surface with a relatively thin facing that is non-magnetic, but highly conductive, e.g., a copper-containing facing, and (2) a rotating element below the stationary element containing concentric iron pole faces energized by an embedded ring of the permanent magnet material. The dimensions of such a stationary element are larger than the adjacent mating dimensions of the outermost pole face of the rotating element so that the laminated thin facing contributes a damping force for transversely directed vibrations. Furthermore, the magnetic forces exerted by the collection of elements including at least one of the novel stationary elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the conditions required for a rotating body to be stably supported by a magnetic bearing system over a finite range of those displacements. More specifically, the larger dimensions of the novel stationary element inhibit the generation of drag-producing eddy currents from periodic fluxes developed in either the stationary or rotating element(s).

The present magnetic bearing system contains at least two discrete subsystems, at least one of which is energized by mobile permanent-magnet material and the other by the laminated thin facing stationary element. These subsystems, when properly disposed geometrically, act together to support a rotating element in a state of dynamic equilibrium. However, owing to the limitations imposed by Earnshaw's Theorem, the present magnetic bearing systems still do not possess a stable equilibrium at zero rotational speed. Therefore, means are provided to hold the suspended system in equilibrium until its speed has exceeded a low critical speed where dynamic effects take over and thereby permit the achievement of a stable equilibrium for the rotating object.

Because of the improved elements and characteristics it is expected that magnetic bearing systems based on the present invention can be employed in a variety of useful applications. These include, for example, electromechanical batteries (modular flywheel energy storage devices), high-speed spindles for machining, hard-disc drive systems for computers, electric motors and generators, rotating target x-ray tubes, and other devices where simplified magnetic bearing systems can satisfy a long-standing practical need for low-friction, maintenance-free, bearing systems.

BRIEF DESCRIPTION OF THE DRAWINGS

FIG. 2b is a top view of the repelling magnetic bearing element of FIG. 2a.

FIG. 4b is a top view of the compound attractive magnetic bearing element of FIG. 4a.

FIG. 6b is a top view of the axially symmetric reduced derivative attractive magnetic bearing element of FIG. 6a.

DETAILED DESCRIPTION OF THE INVENTION

In the design of passive magnetic bearing systems in accordance with the teachings of Post '221, which is incorporated herein by reference in its entirety, it is necessary to use a combination of passive elements with compensating force derivatives in order to achieve stable levitation. One such element described in Post '221 is an upper stationary element(s) coupled with spring-like or resilient material, or compliant and/or energy-dissipating supports for the purpose of damping out oscillations of the rotating parts, including whirl-type instabilities. The present invention relates to an improved stationary element, preferably in disc form, fabricated from a "soft" magnetizable material such as iron having a relatively thin attached layer of non-magnetic, highly conductive material such as copper or aluminum positioned adjacent to a surface of the element that attracts the rotating part of the system. Such a highly conductive thin layer on the stationary element provides a single device with a dual-function, i.e., damping the whirl-type instabilities while still supporting (e.g., levitating) a rotating object. Through the nature of its design, the dual-function device does not introduce displacement-dependent drag forces that contribute to the generation of the whirl-type instabilities. Although the present invention is directed to improvements in the teachings of Post '221, describing the embodiments of the present invention necessarily includes an initial outline of the theoretical considerations that undergird the operation of Post '221 as well as its disclosed elements.

Figure 1:
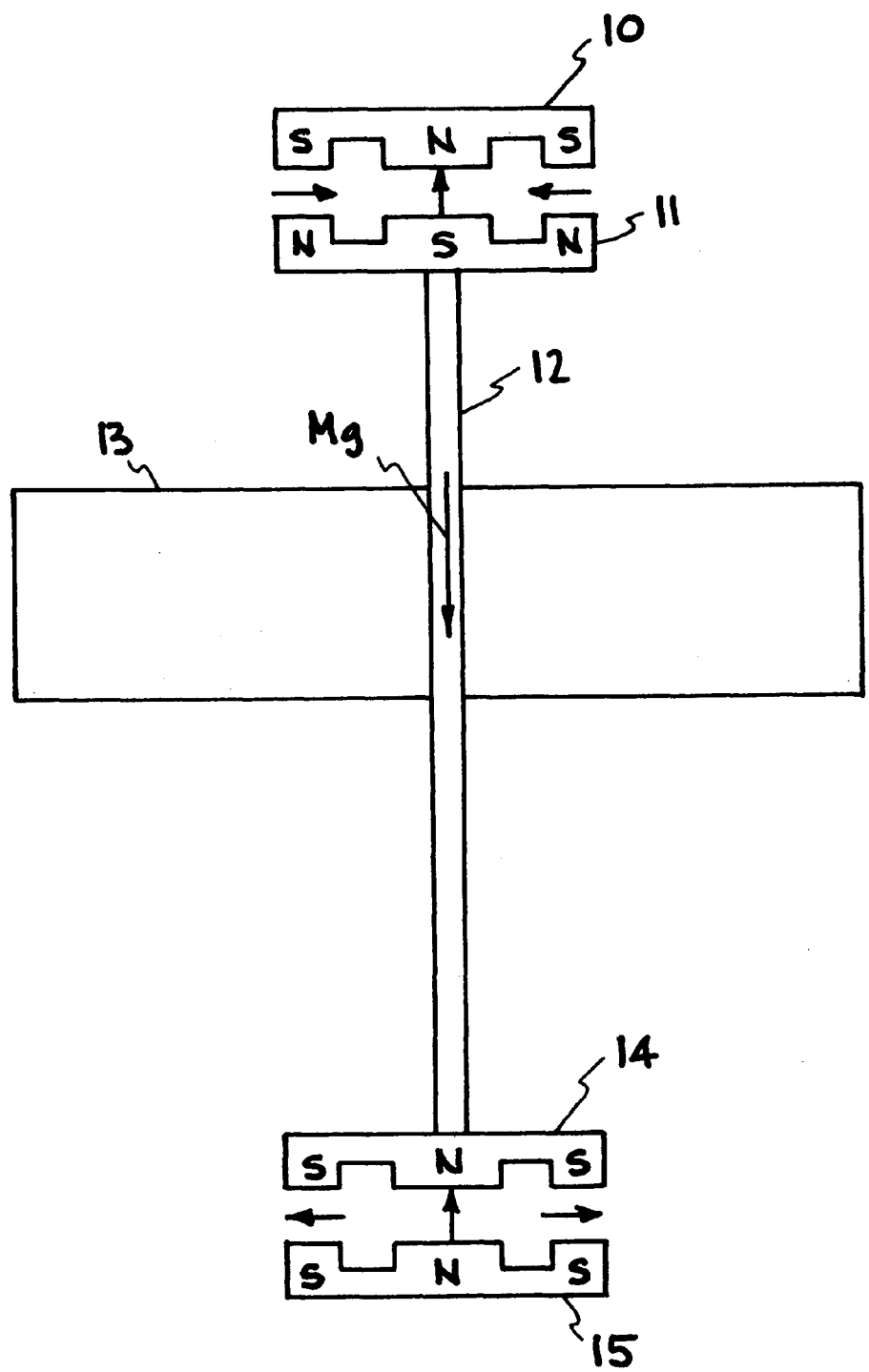
FIG. 1 shows a vertical-axis system.

As a starting point prior to discussing the present invention, the conditions that must be satisfied in order for the suspended object (for example, a flywheel rotor) to exist in a state of force equilibrium will be defined. As an example, consider a vertical-axis system such as is shown in FIG. 1. This figure shows a rotor subjected to the force of gravity and to forces from a bearing/suspension system, with the forces being shown as vectors. Shaft 12 and rotor 13 are supported by an upper attractive bearing comprised of a stationary component 10 and a rotating part 11, and by a lower, repelling bearing composed of a rotating element 14 and a stationary element 15. Not shown are the permanent magnet elements within the bearing elements needed to energize them. In the vertical direction the upward forces exerted by the top and bottom bearing must sum up to the downward force of gravity. Designating these vertical-acting forces as $F_{vA}$(upper bearing elements) and $F_{vB}$(lower bearing elements), the equation for vertical force equilibrium becomes:

$$F_{vA}+F_{vB}Mg=0, \qquad [1]$$

where M is the mass of the rotor, and g is the acceleration of gravity. Since the vertical force exerted by the bearing elements depends on the axial position of the rotating element relative to the stationary element, there will be a unique axial position of the rotor where this equation can be satisfied (assuming sufficient lifting power for the two bearings combined, of course).

For displacements at either end in the radial direction, the condition for force equilibrium (assuming no lateral accelerations) is simply that there be no net radial force exerted by the bearing elements. For axially symmetric bearings this condition will be automatically satisfied when the axis of the rotating element coincides with the axis of the stationary element, as shown schematically in FIG. 1. In this centered position (and only in this position) any internal radial forces exerted, for example, by magnets used in the bearing element will be exactly canceled.

While the above prescription, if followed, will assure that the rotating elements (rotor plus rotating parts of the magnetic bearing system) exist in a state of equilibrium against external and internal forces, it does not say anything about whether this equilibrium is a stable one. To achieve a stable state against displacements from the position of force equilibrium it is necessary to impose new constraints, in this case on the derivatives of the forces themselves, that is, on the rates at which the forces exerted by the bearing elements vary with displacements from equilibrium. Thus, it will be necessary to satisfy quantitative constraints on certain vector sums of these derivatives for the plurality of bearing elements, acting in concert. In order to satisfy these constraints it will be required to employ special designs for each of the bearing elements, and the teachings in Post '221 and herein provide unique magnetic bearing elements that are capable of satisfying the quantitative requirements on the force derivatives.

Before listing the equations defining the conditions under which the bearing systems described herein are stable under displacements from a position of force equilibrium, it is necessary to define the nature of the displacements that must be considered. There are three: The first is an axial displacement (up or down in the case shown in FIG. 1). The second is a transverse displacement, without tilting of the axis of rotation. The third is a symmetric tilt about an axis that is perpendicular to the axis of rotation and is located midway between the upper and lower bearing elements. It can be seen that an arbitrary displacement can be described as a linear combination of these three basic displacements.

A rotating system can be described as being supported stably provided that a displacement from its equilibrium position in any direction results in a restoring force that returns it to that equilibrium position. The mechanical analogy is an object suspended by pairs of tension springs that lie above and below, to the left and right, and in front of and behind the object. As can be seen intuitively, if the object is momentarily displaced in any direction from its equilibrium position it will feel a restoring force that will cause it to return to its equilibrium position after transients have died out.

A mechanical tension spring has the property that the force it exerts increases as it is stretched, in other words, that force can be expressed (for small displacements) through a force derivative, as follows:

$$F=(dF/dx) Dx, \qquad [2]$$

where Dx is the displacement and dF/dx is the rate of change of the force with displacement. It is common engineering practice to represent the negative of the force derivative of springs by the letter K, so that our equation can be written as:

$$F=K_x Dx, \qquad [3]$$

where the subscript "x" refers to the spring constant for displacements in the x direction. The minus sign in equation [3] arises from the convention that a mechanical spring always operates in a way to oppose the displacement, resulting in a force that is directed oppositely to the displacement.

By analogy to the spring, the force derivatives of magnetic bearing elements can be represented by values of constants K, with one important difference: In the case of magnetic bearing elements these constants may be either positive (forces anti-parallel to the displacement, i.e., restoring forces) or negative (forces parallel to the displacement). In fact, Earnshaw's Theorem tells us that any simple magnetic bearing element, if it is restoring for one type of displacement, say radial, will always be destabilizing for the other displacement, here axial. From this fact follows the need for servo control of conventional magnetic bearings. It is therefore apparent that the use of a single simple magnetic levitating bearing element, whether it be attractive (above the rotor in FIG. 1) or repelling (below in FIG. 1) cannot lead to a stable equilibrium. As set forth herein, in order to achieve a stable equilibrium using only passive elements (e.g. permanent magnets to provide the magnetomotive force) it is necessary to use a combination of elements, designed so that they together satisfy prescribed quantitative conditions on their force derivatives.

It is the purpose herein to set forth quantitatively the conditions required for a rotating body to be stably supported by a magnetic bearing system and to show one or more unique designs and combinations of the elements of such a system that satisfy these conditions under dynamic conditions, i.e., when the rotation speed exceeds a lower critical value.

Theoretical analyses of the conditions for positional stability of a magnetically levitated rotating object yield the following conditions:

For stability against displacements parallel to the axis of rotation, it is required that:

$$\sum_j K_{zj} > 0, \qquad [4]$$

where $K_{zj}$ is the value of the spring constant (negative of the force derivative) in the z (axial) direction for the jth bearing element. The physics content of this equation is that it describes the requirement that the net force derivative of the magnetic bearing system should be positive, i.e. that there should exist a net restoring force for displacements in the axial direction.

A necessary and sufficient condition for stability against radial translational displacements (no tilt) is simply that:

$$\sum_j K_{rj} > 0, \qquad [5]$$

where $K_{rj}$ is the value of the spring constant (negative of the force derivative) in the r (radial) direction for the jth bearing element. It is clear from what has been said earlier that it is not possible to satisfy both of these conditions with simple bearing elements if j<2. It can also be shown that it is also impossible to achieve better than a neutrally stable (i.e. incipiently unstable) situation with simple passive elements even if $j \geqq 2$. To achieve a truly stable state it is necessary to use special elements, so designed as to achieve, together with the other element or elements, the quantitative requirements imposed by equations [4] and [5].

The satisfaction of the two equations, [4] and [5], will insure the existence of an equilibrium that is stable against both axial and radial-translational displacements. It may not, however, insure stability against tilt-type displacements. There are two possible avenues to insuring tilt stability, while at the same time maintaining stability against the other two classes of displacement.

The first way is to insure that, in equation [5], those values of $K_{rj}$ associated with a given location (i.e. top or bottom in FIG. 1) are net positive, i.e. if the $K_r$ value of one of the two adjacent elements is negative in sign, then the $K_r$ value of the other element must be positive and larger in magnitude than the negative one. This condition will be satisfied in embodiments of the invention that are described herein. A second way is to take advantage of gyroscopic effects to stabilize an otherwise tilt unstable system in which, even though equation [5] is satisfied, one (or more) of the values of $K_{rj}$ is sufficiently negative that the K values of two adjacent bearing elements (the bottom two in FIG. 1) add up to a net negative value. In this case above a low critical speed (which can be calculated theoretically, and which can be made to lie below the intended operating speed range of the rotating system) the system will be stable. Below that speed it will be necessary (as it is in other embodiments to be described) to use disengaging mechanical or other elements to keep the system stable for speeds lower than the critical speed.

The invention herein and in Post '221 achieves a state of stable equilibrium above a critical speed by use of a collection of passive elements using permanent magnets to provide their magnetomotive excitation. The magnetic forces exerted by these elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the requirements implied by equations [4] and [5] over a finite range of those displacements. In other words, the inventive apparatus comprises at least one rotating member having a central axis of rotation; magnetic means for stabilization of the rotating member above a critical angular velocity, wherein the magnetic means comprise a plurality of elements comprised of stationary and co-rotating parts, the elements having force derivatives of such magnitudes and signs that they together satisfy the requirement that the negative of the sum of the time averaged derivatives of the force exerted between the stationary and the rotating part of each element in the axial direction is greater than zero; the negative of the sum of the time averaged derivatives of the force between the stationary and the rotating part of each element in the radial direction is greater than zero; and the sum of the vertical forces exerted by the stationary elements on the rotating elements is at least equal to the force of gravity on the rotating elements and any other co-rotating elements to which they are attached; and means for sustaining the rotating member in stable equilibrium until the rotating member has exceeded said critical angular velocity.

In conventional magnetic bearing embodiments, the passive elements are used, in various combinations, to achieve positional stability. The design in that their configurations and structures is chosen so as to satisfy the quantitative requirements on their force derivatives that have been described previously.

Figure 2A:
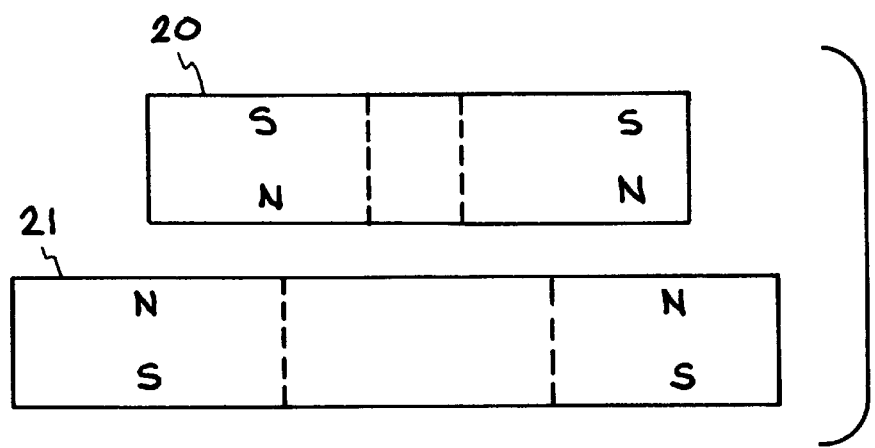
FIG. 2a is a side view of a repelling magnetic bearing element.
Figure 2B:
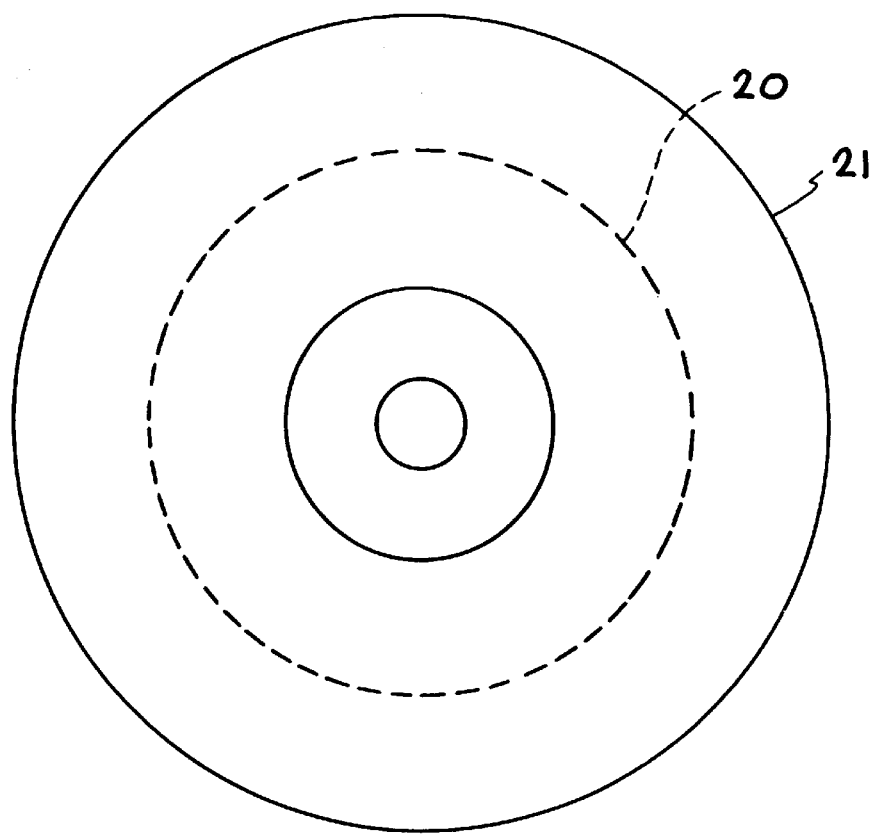
Figure 3:
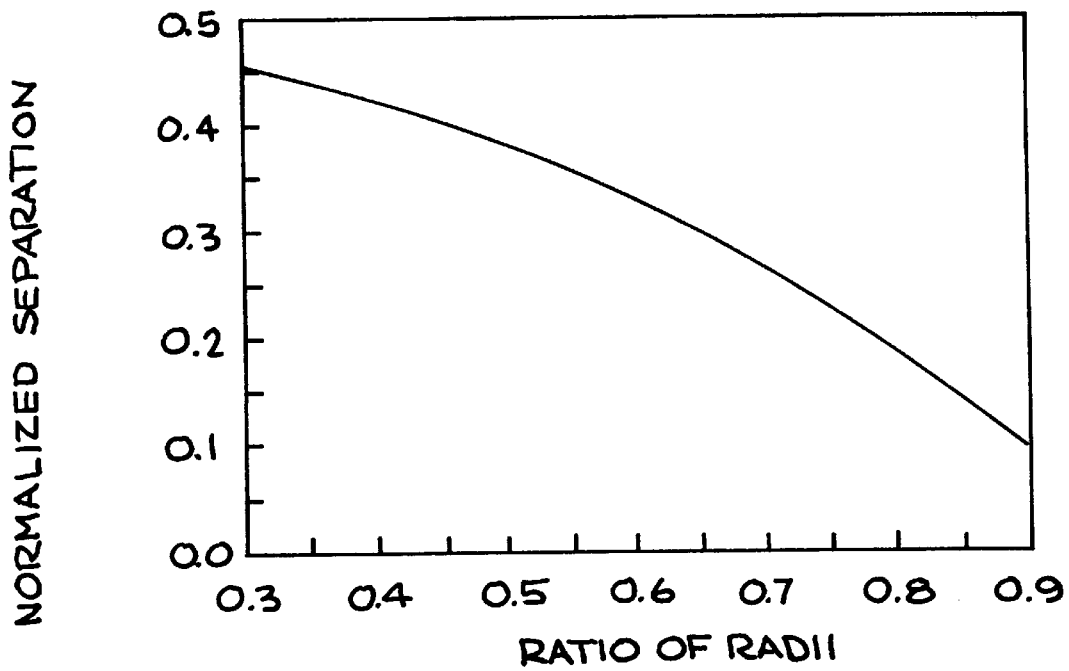
FIG. 3 is a graph of the diameter ratios between two ring magnets.

FIGS. 2a and 2b depict a conventional repelling (levitating) magnetic bearing element such as taught in Post '221 made up of two annular rings made of permanent magnet material magnetized in the directions shown. The magnetic bearing element is made of a rotating upper element 20, and a stationary lower element 21. As seen in the figures, the diameter of the upper ring is different from that of the lower ring, and this difference in diameter is preferred for its proper operation and distinguishes this repelling bearing element from those used in previous magnetic bearing systems. In the example shown, the upper ring 20 is the rotating component, while the lower ring 21 is stationary. A theoretical analysis of the repelling (vertical) force for this pair of rings shows that the force is always repulsive, but that it has a maximum value at a calculable height above the lower ring. In the centered position shown the horizontally directed force is, of course, zero. If one now calculates the derivatives of the force, both vertical and horizontal, the following is found. At the point of maximum vertical force the first derivative of the force is zero, both for vertical and horizontal displacements with respect to that position. Above that position the force derivative for vertical displacements is negative (i.e. the $K_z$ value is positive), corresponding to an axially stable situation. That is, a weight equaling the repulsive force at that position would be stably levitated, as far as vertical displacements are concerned. When the value of $K_r$ at that same position is calculated, it is found to be negative (radially unstable) and equal in magnitude to 50 percent of the value of $K_z$. The negative sign is to be expected from Earnshaw's Theorem; the factor of 2 reduction comes from the circular average of the forces between the magnets. It is important to note that if the diameters of the two magnets had been the same, there would have been no maximum point in the repulsive force at a finite vertical separation between the magnets, thus no place where both the axial and radial K values vanished, or in the vicinity of which they could be made small. To illustrate this point, FIG. 3 shows the locus of points representing the diameter ratios (horizontal axis) and vertical separations (vertical axis) between two ring magnets, points where the force derivatives approach zero. The curve shown is representative; for thicker rings or different hole sizes somewhat different plots would result. It should also be apparent that the desired property, i.e., the achievement of control over the force derivatives by adjustment of size and relative position of annular permanent magnet elements, will also apply if the smaller of the two magnet elements fits within the hole of the larger element, so that the two are nested together. For this case the locus curve of zero force derivatives will of course deviate from that shown in FIG. 3.

Figure 4A:
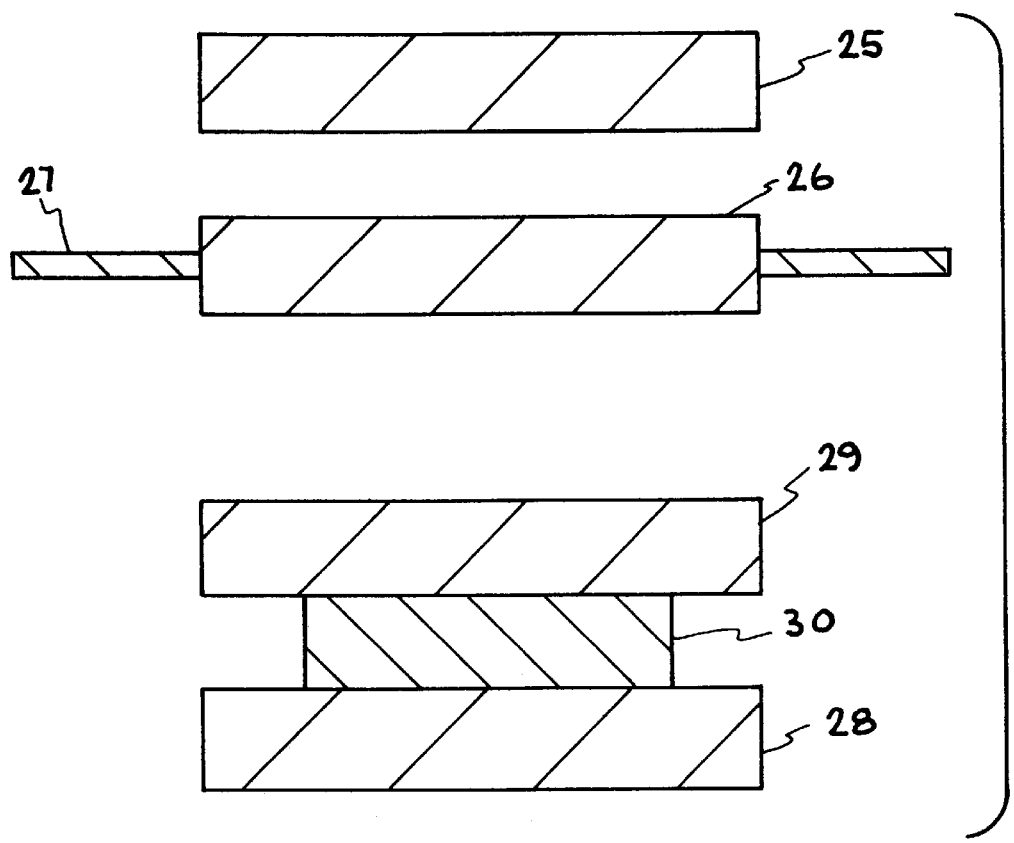
FIG. 4a is a side view in cross-section of a compound attractive magnetic bearing element.
Figure 4B:
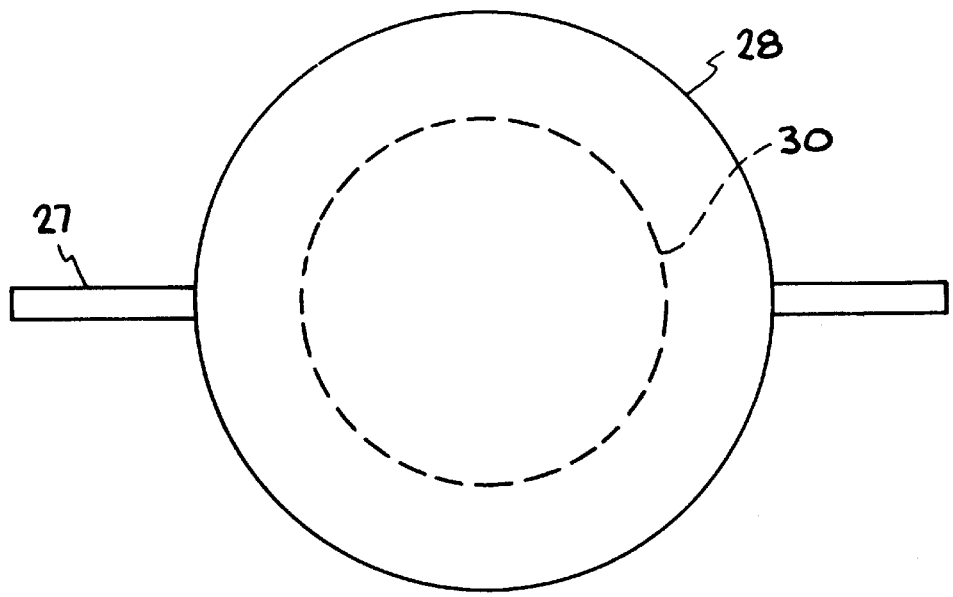

FIGS. 4a and 4b depict schematically a conventional compound attractive magnetic bearing element such as taught in Post '221 comprised of upper stationary elements 25 and 26, wherein element 25 is fabricated from permanent magnet material, and element 26 is fabricated from a "soft" magnetizable material such as iron. The rotating parts of the bearing also include an element 28 made of permanent-magnet material and an element 29 made of soft magnetizable material. They are coupled mechanically with a spacer 30 made of non-magnetic material, such as aluminum. Upper element 26 is held in place by support 27, which couples to spring-like or resilient material, not shown, for the purpose of damping out oscillations of the rotating parts that are supported by lower bearing elements 28, 29, and 30.

FIGS. 4a and 4b depicts an alternative method of achieving control of the force derivatives through design. In these figures, two equal-diameter permanent-magnet discs (or annular rings) are used. In the gap between them disc- or washer-shaped iron pole pieces are held in place by non-magnetic material supports. In operation one of these disc pairs would be stationary, and the other one would be attached to co-rotating elements, such as a flywheel rotor. By adjusting the spacing of these discs relative to the permanent-magnet elements, the attractive (or repulsive) force and its derivatives can be controlled in order to meet design criteria. Since the non-rotating iron pole piece need not be rigidly coupled to its surroundings, it has been taught that it could be connected to compliant and/or energy-dissipating supports to suppress whirl-type instabilities. Because the mass of this pole piece is designed to be less than the mass of its permanent-magnet exciter assembly, it has been taught to be better able to respond to the dynamic effects associated with whirl effects, and be better able to suppress them.

Figure 5:
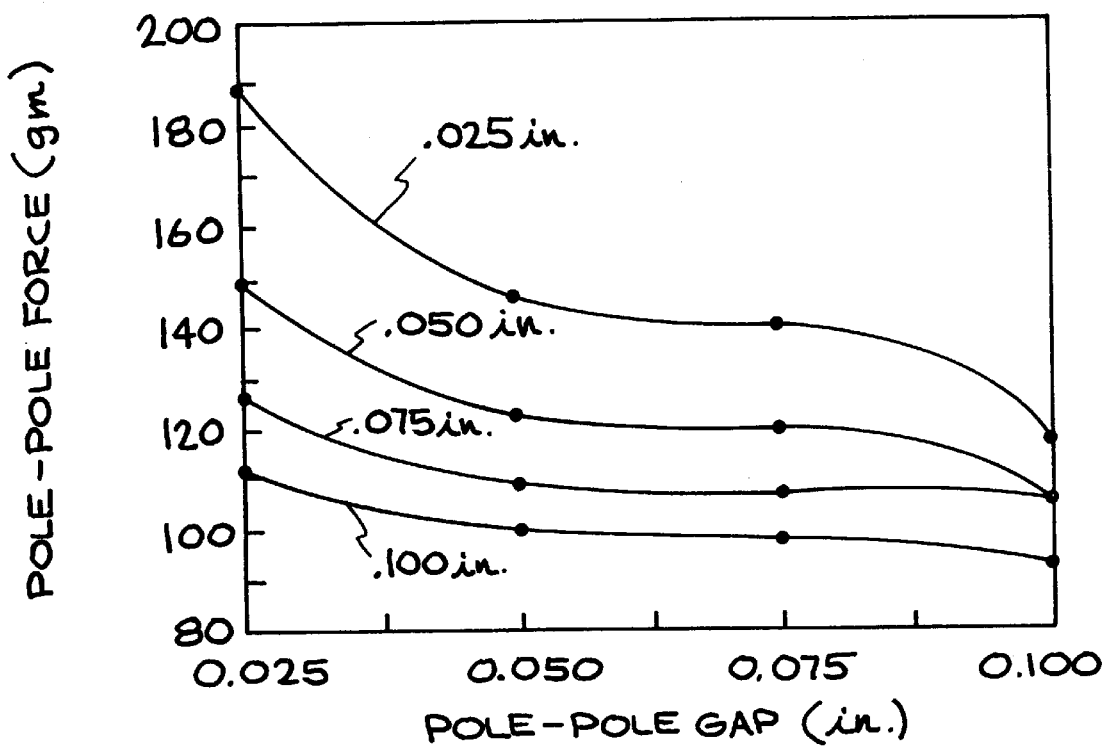
FIG. 5 is a plot of attractive force versus displacement.

FIG. 5 shows a plot of the calculated attractive force between a systems such as is shown in FIGS. 4a and 4b. Over an appreciable range of separations, the plot of attractive force versus displacment is nearly flat, corresponding to a small, and pre-determinable value of the axial force derivative.

The primary purpose of the special configurations just described has been to provide a levitating permanent magnet bearing element where the magnitude of the force derivatives can be adjusted in order that this element, when taken together with other elements described in Post '221 can satisfy the quantitative requirements for positional stability embodied in equations [4] and [5].

The same theory that gave the analysis of the repelling pair of magnets shown in FIGS. 2a and 2b also can give the force and force derivatives for a case where the direction of magnetization of one of the magnets is reversed, so that the pair becomes attractive. In this case the position of zero derivative is the same as before, but now the signs of the derivatives are reversed. For larger separations $K_z$ is negative (unstable axially), while $K_r$ is positive (stable radially). For smaller separations the situation is again reversed, with the K values corresponding to axial stability and radial instability. Again, the novel use of different diameter magnet rings and the special choice of separation distance allows control over the axial force of attraction and its derivatives so as to, together with other elements, satisfy the previously stated requirements for positional stability of the rotating body.

Figure 6A:
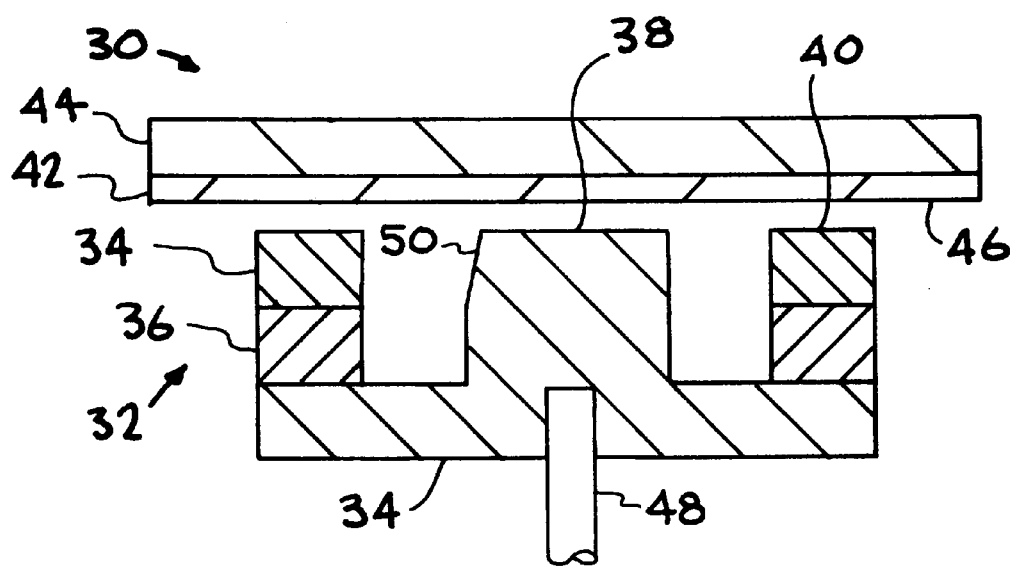
FIG. 6a is a cross-sectional side view of an axially symmetric reduced derivative attractive magnetic bearing element.
Figure 6B:
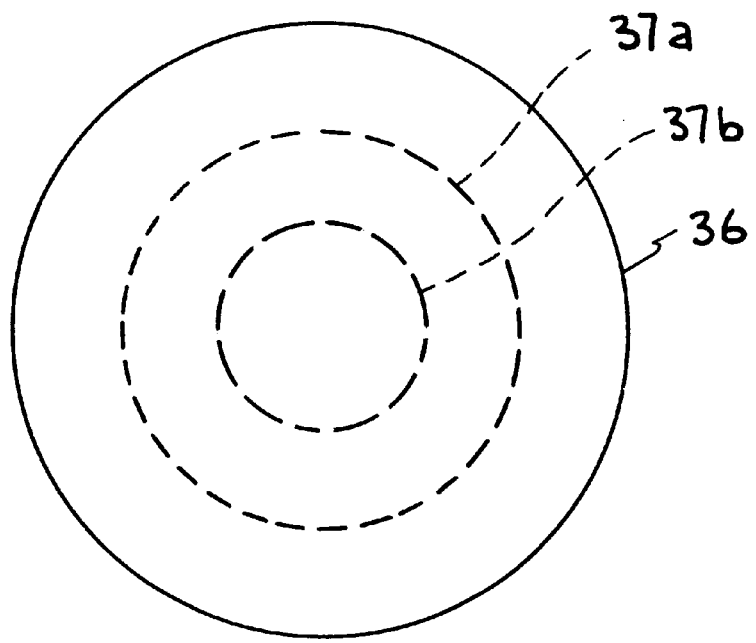

In the design of attracting magnetic bearings for use in the invention herein disclosed, and where it is desirable to utilize the flux-directing property of iron pole faces, novel design concepts which are herein claimed as a part of the invention, are needed. FIGS. 6a and 6b are a schematic view (in section) of an single axially assymmetric "dual-function" attractive magnetic bearing element that provides means for stabilization of a rotating member, particularly above a critical angular velocity, and also for damping out oscillations of the rotating parts (e.g., damping whirl-type instabilities). The stabilization means comprise a plurality of elements comprised of stationary and co-rotating parts such as a bearing element including an upper stationary element 30 and a lower rotatable element 32. Rotatable element 32 is usually fixedly connected to a vertical shaft 48 of the rotating member through its central axis of rotation (not shown). A typical rotating member can be a rotor. The lower rotatable element can be fabricated from a piece of soft magnetizable material 34 such as iron and a piece of permanent magnetic material 36 fixedly connected to and between portions of the piece of soft magnetizable material 34. The representative rotatable element 32 has concentric iron pole faces, including inner pole face 38 and outer pole face 40 which are energized by an embedded ring of permanent magnet material 36 which can be of similar or equal diameter to that of outer pole face 40. In some applications, the pole faces such as 38 and 40 can be tapered to increase the magnetic field at the gap, or alternatively, grooves can be cut in such poles faces to produce a concentric series of radially narrower poles. The effect of such modifications in the pole faces of rotatable element 32 is to increase the damping coefficient (described hereinafter) and/or the attractive force between the stationary and rotatable elements.

The upper stationary element 30 contains a piece of highly conductive, non-magnetic material 42, such as stainless steel, titanium, aluminum or preferably copper, connected to and beneath a piece of soft magnetizable material 44 (e.g., iron). Preferably, highly conductive, non-magnetic material 42 can be fabricated to completely cover the lower face 46 of soft magnetizable material 44. The diameter of upper stationary element 30 is substantially larger than the diameter of outer pole face 40 of lower rotatable element 32. The attraction occurs between upper stationary element 30 and the matching pole faces, for example pole faces 38 and 40. FIG. 6b is an end view intended to show the circular nature of the bearing element.

As a result of such relative dimensions between the stationary and rotatable elements, the magnetic bearing element provides a lifting force having a positive axial force derivative, but has a near-zero radial force derivative. The presence of the highly conductive, non-magnetic material (e.g., copper) facing 46 of piece 42 on stationary element 30 also contributes a damping force for transversely directed vibrations, particularly whirl-type instabilities. Furthermore, facing 46 contributes essentially no displacement-dependent azimuthally directed drag force due to the axial symmetry of rotatable element 32 and the larger diameter of stationary element 32. Thus, upon small fixed radial displacements of rotatable element 32 from its normal axis of rotation, no periodically varying fluxes are developed in either stationary element 32 or rotatable element 30, consequently eliminating essentially any drag-producing eddy currents.

The magnitude of the damping coefficient for the magnetic bearing element can be predetermined from the integration, in the radial direction, of the axial component of the square of the magnetic field between the stationary and rotatable elements ($B^2_z rdr$), multiplied by the thickness t of the highly conductive, non-magnetic material facing (calculated in meters), and divided by the resistivity p of the highly conductive, non-magnetic material (calculated in ohm-m.). The expression is summarized as follows:

$$\beta = \frac{\pi t}{\rho} \int B_z^2 r dr \quad \text{(Newton m}^{-1}\text{ sec.)}$$

Techniques known to those of ordinary skill in the art that increase the damping coefficient and/or the attractive force between the stationary and rotatable elements can be employed.

Changes and modifications in the specifically described embodiments can be carried out without departing from the scope of the invention, which is intended to be limited by the scope of the appended claims.

What is claimed is:

1. A magnetic bearing apparatus comprising:
   an upper stationary element comprising a copper facing material laminated to and beneath a disc-shaped soft iron plate;
   at least one rotating member having a central axis of rotation and at least one lower rotatable element magnetically connected to and beneath said upper stationary element, said lower rotatable element comprising soft iron and a permanent magnetic material fixedly connected to and between portions of said soft iron, and
   wherein said copper facing having a greater diameter than the diameter of a soft iron facing on said rotatable element.

2. An magnetic bearing apparatus comprising:
   an upper stationary element comprising a piece of conductive, non-magnetic material connected to and beneath a piece of soft magnetizable material; and
   at least one rotating member having a central axis of rotation and at least one lower rotatable element magnetically connected to and beneath said upper stationary element, said lower rotatable element comprising a second piece of soft magnetizable material and a piece of permanent magnetic material fixedly connected to and between portions of said piece of soft magnetizable material.

3. The apparatus defined in claim 2 wherein said upper stationary element comprises a disc-shaped iron plate comprising copper or aluminum laminated on the lower surface of said plate.

4. The apparatus defined in claim 2 wherein said lower rotatable element comprising at least one concentric iron pole face embedded with an annular ring comprising permanent magnet material.

5. The apparatus defined in claim 2 wherein said upper stationary plate comprises a larger diameter than said lower ring and attract each other.

6. The apparatus defined in claim 2 wherein said lower rotatable element comprises tapered pole faces on said soft magnetizable material.

7. The apparatus defined in claim 2 wherein said soft magnetizable material comprises a polar face on said lower rotatable element having concentric inner and outer pole faces.

8. An apparatus comprising:
   at least one rotating member having a central axis of rotation and at least one lower rotatable element magnetically connected to and beneath an upper stationary element, said lower rotatable element comprising a piece of soft magnetizable material and a piece of permanent magnetic material fixedly connected to and between portions of said piece of soft magnetizable material;
   stabilization means for stabilization of said rotating member above a critical angular velocity, wherein said means comprise a plurality of elements comprised of stationary and co-rotating parts, including said upper stationary element comprising a piece of conductive, non-magnetic material connected to and beneath a piece of soft magnetizable material;
   said elements having force derivatives of such magnitudes and signs that they together satisfy the requirement that:
   the negative of the sum of the time averaged derivatives of the force exerted between said stationary and said rotating part of each element in the axial direction is greater than zero;
   the negative of the sum of the time averaged derivatives of the force between said stationary and said rotating part of each element in the radial direction is greater than zero, but less than that in said axial direction; and
   the sum of the vertical forces exerted by the stationary elements on the rotating elements is at least equal to the force of gravity on said rotating elements and any other co-rotating elements to which they are attached; and
   means for sustaining said rotating member in stable equilibrium until said rotating member has exceeded said critical angular velocity.

9. The apparatus of claim 8, further comprising a vertical shaft fixedly connected to said rotating member through said central axis of rotation.

10. The apparatus of claim 8, wherein said rotating member is positioned to utilize the force of gravity to suppress tilt instabilities.

11. The apparatus of claim 9, wherein said stabilization means comprise:
    at least one radial stabilization element; and
    at least one axial stabilization element.

12. The apparatus of claim 11, wherein said at least one radial stabilization element comprises an attracting magnetic bearing element comprising:
    said upper stationary element comprising a disc-shaped iron plate comprising copper or aluminum laminated on the lower surface of said plate,
    said lower rotatable element comprising at least one concentric iron pole face embedded with an annular ring comprising permanent magnet material,
    and wherein said upper stationary plate and said lower ring have different diameters and attract each other.

13. The apparatus of claim 11, wherein said at least one radial stabilization element comprises a compound attractive magnetic bearing element comprising:
    said upper stationary element comprising a piece of copper material, a piece of soft magnetizable material magnetically connected to and above said piece of copper material, and a support fixedly connected to said piece of soft magnetizable material; and
    said lower rotatable element magnetically connected to and beneath said upper stationary element, said lower rotatable element comprising:
    a piece of soft magnetizable material having tapered pole faces, and
    a ring of permanent magnetic material wherein said ring is fixedly connected to and between portions of said piece of soft magnetizable material.

14. The apparatus of claim 11, wherein said at least one radial stabilization element comprises an axially symmetric reduced derivative attractive bearing element comprising:
    a first element comprising:
    a disc shaped iron structure having a central axis;
    a plate of copper metal fixedly connected to the lower edge of said disc-shaped iron structure; and
    a second element comprising soft iron and a permanent magnet material, further comprising a disc shaped structure having pole faces disposed opposite said plate of copper metal.

15. The apparatus of claim 11, wherein said at least one radial stabilization element comprises a reduced derivative, attracting-type magnetic bearing element comprising:

a first element comprising:
  a disc shaped iron structure;
  a plate of copper or aluminum metal is fixedly connected to the lower edge of said disc shaped iron structure; and a second element comprising:
  a disc shaped iron structure;
  a permanent magnet material fixedly connected to and beneath said disc shaped iron structure beneath;
and wherein the diameter of said first element is greater than the diameter of said second element.

* * * * *